(12) United States Patent
Hosogi et al.

(10) Patent No.: US 10,851,757 B2
(45) Date of Patent: Dec. 1, 2020

(54) IGNITION TIMING CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Takayuki Hosogi, Toyota (JP); Rihito Kaneko, Miyoshi (JP); Kenji Senda, Okazaki (JP); Norihito Hanai, Toyota (JP); Hisayuki Ito, Toyota (JP); Masaaki Yamaguchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/444,139

(22) Filed: Jun. 18, 2019

(65) Prior Publication Data

US 2020/0032762 A1 Jan. 30, 2020

(30) Foreign Application Priority Data

Jul. 30, 2018 (JP) ................................. 2018-142411

(51) Int. Cl.
*F02P 5/12* (2006.01)
*F02P 5/04* (2006.01)
*F02P 5/15* (2006.01)
*F02P 5/152* (2006.01)

(52) U.S. Cl.
CPC ................. *F02P 5/12* (2013.01); *F02P 5/045* (2013.01); *F02P 5/152* (2013.01); *F02P 5/1516* (2013.01)

(58) Field of Classification Search
CPC .. F02P 5/12; F02P 5/045; F02P 5/1516; F02P 5/152; F02P 5/1523; F02P 5/142; F02D 41/2438; F02D 41/2483; F02D 41/18; F02D 41/1448; F02D 41/029; F02D 41/0052; F02D 41/2429; F02D 41/0065; F02D 41/0077
See application file for complete search history.

(56) References Cited

U.S. PATENT DOCUMENTS

| | | | | |
|---|---|---|---|---|
| 5,023,794 A | * | 6/1991 | Klenk | F02D 41/2441 123/406.6 |
| 8,973,429 B2 | * | 3/2015 | Gwidt | G01L 23/225 73/114.07 |
| 9,097,196 B2 | * | 8/2015 | Buslepp | F02D 41/1497 |
| 9,121,362 B2 | * | 9/2015 | Betz | F02D 41/221 |
| 9,127,604 B2 | * | 9/2015 | Davis | F02P 5/152 |
| 9,133,775 B2 | * | 9/2015 | Betz | F01L 13/0031 |
| 9,157,825 B2 | * | 10/2015 | Hamama | G01L 23/225 |
| 9,441,556 B2 | * | 9/2016 | Hamama | F02D 35/027 |

(Continued)

FOREIGN PATENT DOCUMENTS

| | | |
|---|---|---|
| EP | 3205865 A1 | 8/2017 |
| JP | 2007-016609 A | 1/2007 |

(Continued)

*Primary Examiner* — Joseph J Dallo
(74) *Attorney, Agent, or Firm* — Oliff PLC (57) ABSTRACT

A CPU advances ignition timing within a range in which knocking can be suppressed by feedback control based on an output signal of a knocking sensor. The CPU sets the igniting timing based on a feedback adjustment amount and a learning value. The CPU limits timing advancing update of the learning value when an exhaust pressure is higher than or equal to a threshold.

10 Claims, 6 Drawing Sheets

(56) References Cited

U.S. PATENT DOCUMENTS

| | | | |
|---|---|---|---|
| 9,562,509 B2* | 2/2017 | Kunze | F02P 5/152 |
| 9,702,315 B1* | 7/2017 | Palmer | F02D 43/00 |
| 9,845,752 B2* | 12/2017 | Verdejo | F02D 41/009 |
| 2006/0124107 A1 | 6/2006 | Sauler et al. | |
| 2016/0069285 A1* | 3/2016 | Watanuki | F02D 41/1448 |
| | | | 701/108 |
| 2017/0167424 A1* | 6/2017 | Glugla | F02D 41/1448 |
| 2018/0209370 A1* | 7/2018 | Moriyama | F02D 41/2467 |

FOREIGN PATENT DOCUMENTS

| | | |
|---|---|---|
| JP | 2010-169051 A | 8/2010 |
| JP | 2017-141791 A | 8/2017 |
| JP | 2017-155729 A | 9/2017 |
| JP | 2017-172460 A | 9/2017 |
| WO | 2004/053328 A1 | 6/2004 |

* cited by examiner

IGNITION TIMING CONTROLLER AND CONTROL METHOD FOR INTERNAL COMBUSTION ENGINE

BACKGROUND

1. Field

The present disclosure relates to an ignition timing controller and control method for an internal combustion engine that includes an EGR passage that connects the exhaust passage and the intake passage to each other and an EGR valve that adjusts the cross-sectional flow area in the EGR passage.

2. Description of Related Art

Japanese Laid-Open Patent Publication No. 2007-16609 discloses an ignition timing controller for an internal combustion engine that includes an EGR passage. The controller updates learning values that define the ignition timing while changing the ignition timing based on the output signal of a knocking sensor. The controller detects the amount of EGR from the opening degree of the EGR valve and the like.

In an internal combustion engine provided with a filter that is arranged at the downstream side of the EGR passage in the exhaust passage to trap particulate matter (PM) in exhaust gas, the pressure at the upstream side of the filter in the exhaust passage tends to increase due to clogging of the filter. Therefore, the actual EGR amount may be greater than the EGR amount based on the opening degree of the EGR valve. Also, since knocking becomes less likely to occur as the EGR amount increases, the learning values that define the ignition timing is updated to a more timing advancing value.

Therefore, if the pressure in the exhaust passage is increased due to clogging of the filter and then such situation is resolved, the learning values that define the ignition timing may become a value corresponding to excessively advanced timing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with a first aspect of the present disclosure, an ignition timing controller for an internal combustion engine is provided. The internal combustion engine includes an EGR passage that connects an exhaust passage and an intake passage to each other, and an EGR valve that adjusts a cross-sectional flow area in the EGR passage. The ignition timing controller is configured to execute: an EGR control process of performing an open-loop control of a ratio of exhaust gas flowing into the intake passage from the EGR passage to fluid that is drawn into the intake passage by operating the EGR valve; and a feedback process of operating an ignition device by advancing ignition timing within a range in which knocking can be suppressed by feedback control based on an output signal of a knocking sensor. The feedback process includes an update process of updating a learning value based on an adjustment amount of the feedback control, a setting process of setting the ignition timing based on the adjustment amount and the learning value, and an update limiting process of limiting timing advancing update of the learning value in a case in which a pressure of exhaust gas flowing into the EGR passage is high as compared with a case in which the pressure of the exhaust gas is low.

In accordance with a second aspect of the present disclosure, an ignition timing controller for an internal combustion engine. The internal combustion engine includes an EGR passage that connects an exhaust passage and an intake passage to each other, and an EGR valve that adjusts a cross-sectional flow area in the EGR passage. The ignition timing controller comprises circuitry that is configured to execute: an EGR control process of performing an open-loop control of a ratio of exhaust gas flowing into the intake passage from the EGR passage to fluid that is drawn into the intake passage by operating the EGR valve; and a feedback process of operating an ignition device by advancing ignition timing within a range in which knocking can be suppressed by feedback control based on an output signal of a knocking sensor. The feedback process includes an update process of updating a learning value based on an adjustment amount of the feedback control, a setting process of setting the ignition timing based on the adjustment amount and the learning value, and an update limiting process of limiting timing advancing update of the learning value in a case in which a pressure of exhaust gas flowing into the EGR passage is high as compared with a case in which the pressure of the exhaust gas is low.

In accordance with a third aspect of the present disclosure, an ignition timing control method for an internal combustion engine is provided. The internal combustion engine includes an EGR passage that connects an exhaust passage and an intake passage to each other, and an EGR valve that adjusts a cross-sectional flow area in the EGR passage. The ignition timing control method includes: performing an open-loop control of a ratio of exhaust gas flowing into the intake passage from the EGR passage to fluid that is drawn into the intake passage by operating the EGR valve; and executing a feedback process of operating an ignition device by advancing ignition timing within a range in which knocking can be suppressed by feedback control based on an output signal of a knocking sensor. The feedback process includes an update process of updating a learning value based on an adjustment amount of the feedback control, a setting process of setting the ignition timing based on the adjustment amount and the learning value, and an update limiting process of limiting timing advancing update of the learning value in a case in which a pressure of exhaust gas flowing into the EGR passage is high as compared with a case in which the pressure of the exhaust gas is low.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An ignition timing controller for an internal combustion engine 10 according to a first embodiment will now be described with reference to the drawings.

Figure 1:
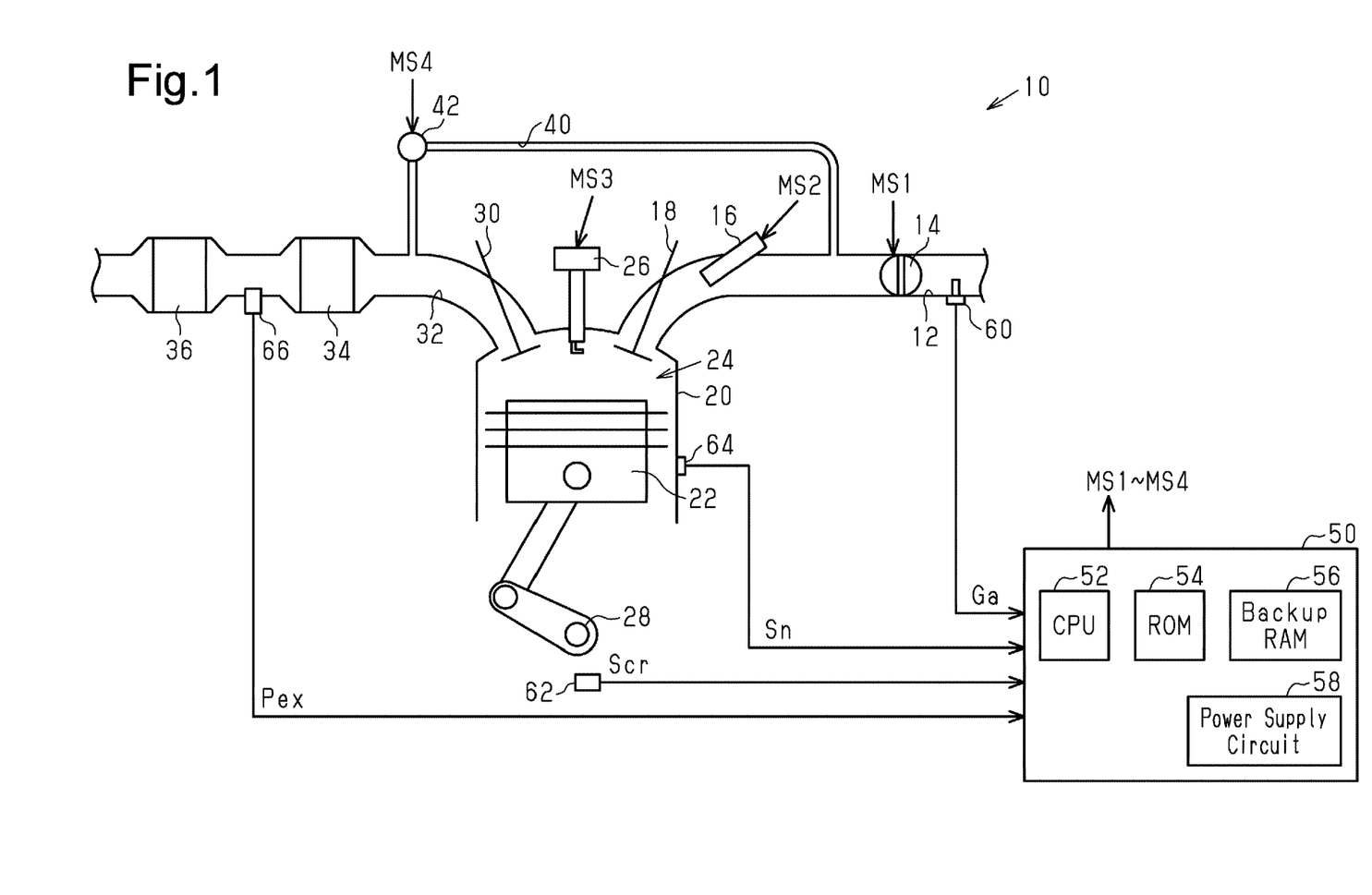
FIG. 1 is a diagram showing a controller according to a first embodiment of the present disclosure and an internal combustion engine.

The internal combustion engine 10 shown in FIG. 1 is mounted on a vehicle. The internal combustion engine 10 includes an intake passage 12. The intake passage 12 is provided with a throttle valve 14 and a port injection valve 16 in order from the upstream side. The fuel injected from the port injection valve 16 and the air drawn into the intake passage 12 flow into a combustion chamber 24, which is defined by a cylinder 20 and a piston 22, as an intake valve 18 opens. Mixture of fuel and air is burned in the combustion chamber 24 by spark discharge of an ignition device 26. The energy generated by combustion is converted into rotational energy of a crankshaft 28 via the piston 22. The air-fuel mixture is burned in the combustion chamber 24 and becomes exhaust gas, and is then discharged to an exhaust passage 32 when an exhaust valve 30 opens. The exhaust passage 32 is provided with a catalyst 34 having an oxygen storage capacity and a filter (GPF 36) that traps particulate matter (PM) in order from the upstream side.

A section of the exhaust passage 32 at the upstream side of the catalyst 34 is connected to the intake passage 12 by an EGR passage 40. The EGR passage 40 is provided with an EGR valve 42, which adjusts the cross-sectional flow area of the EGR passage 40.

A controller 50 controls the internal combustion engine 10. The controller 50 operates operated portions of the internal combustion engine 10, such as the throttle valve 14, the port injection valve 16, the ignition device 26, and an EGR valve 42, thereby controlling the torque and the ratios of exhaust components, which are controlled amounts of the internal combustion engine 10. To control the controlled amounts, the controller 50 refers to an intake air amount Ga detected by an air flowmeter 60, an output signal Scr of a crank angle sensor 62, an output signal Sn of a knocking sensor 64, and an exhaust pressure Pex, which is the pressure in a section of the exhaust passage 32 at the upstream side of the GPF 36 and detected by an exhaust pressure sensor 66.

The controller 50 includes a CPU 52, a ROM 54, a backup RAM 56, and a power supply circuit 58 that supplies power to each part in the controller 50. The CPU 52 controls the controlled amounts of the internal combustion engine 10 by executing programs stored in the ROM 54. Even when the main power supply of the controller 50 is off and no power is supplied to the CPU 52 and the like, the power supply to the backup RAM 56 is maintained.

Figure 2:
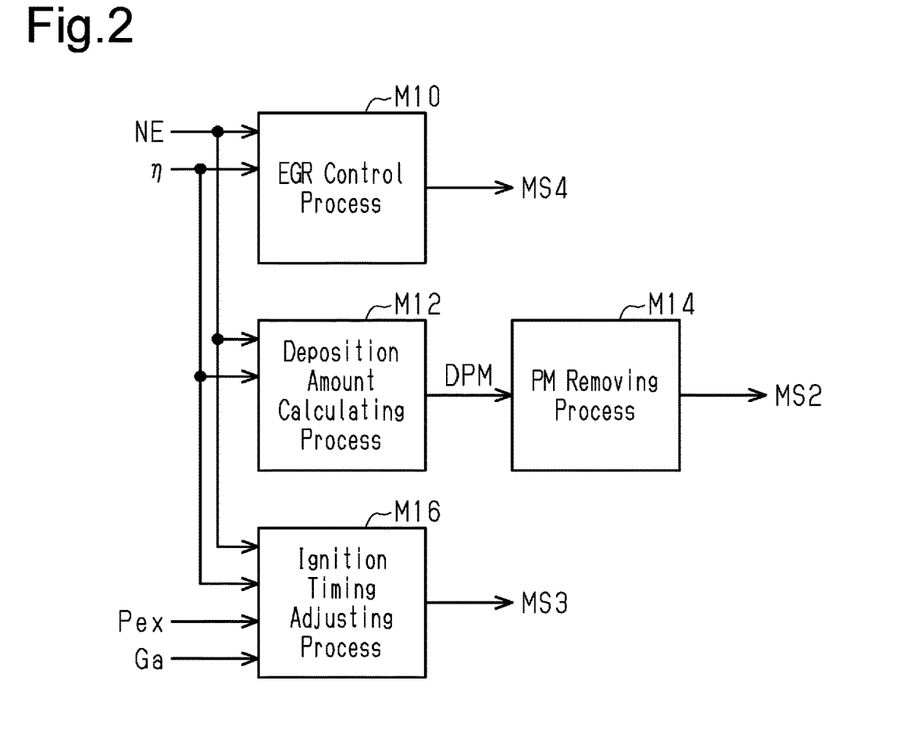
FIG. 2 is a block diagram showing processes executed by the controller.

FIG. 2 shows processes executed by controller 50. The processes shown in FIG. 2 are implemented by the CPU 52 executing programs stored in the ROM 54.

An EGR control process M10 is a process of outputting an operation signal MS4 to the EGR valve 42 to operate the EGR valve 42 in order to control the EGR rate in accordance with the operating point of the internal combustion engine 10. The EGR rate is the ratio of fluid flowing into the intake passage 12 from the EGR passage 40 to the fluid flowing into the intake passage 12. The EGR control process M10 is a process that performs an open-loop control of the EGR rate. The EGR control process M10 is a process of outputting the operation signal MS4 such that the opening degree of the EGR valve 42 becomes a predetermined opening degree in order to control the EGR rate to a target value that corresponds to the operating point of the internal combustion engine 10. The operating point of the internal combustion engine 10 is defined by a rotation speed NE and a charging efficiency $\eta$. The rotation speed NE is calculated by the CPU 52 based on the output signal Scr. The charging efficiency $\eta$ is a parameter that indicates the amount of air filling the combustion chamber 24 of the internal combustion engine 10 (load parameter) and is calculated based on the rotation speed NE and the intake air amount Ga. The charging efficiency $\eta$ is set such that the target value of the EGR rate becomes the greatest in the medium load region.

A deposition amount calculating process M12 is a process of calculating the amount of PM trapped by the GPF 36 (PM deposition amount DPM) based on the operating point of the internal combustion engine 10. The PM removing process M14 is a process of outputting an operation signal MS2 to the port injection valve 16 to operate the port injection valve 16, thereby executing a process of burning and removing the PM trapped in the GPF 36 when the PM deposition amount DPM is greater than or equal to a predetermined amount. The PM removing process M14 includes burning fuel at the catalyst 34 to increase the temperature of the exhaust gas flowing into the GPF 36.

An ignition timing adjusting process M16 is a process of outputting an operation signal MS3 to the ignition device 26 to operate the ignition device 26, thereby adjusting the ignition timing based on the operating point of the internal combustion engine 10, the exhaust pressure Pex, and the like.

Figure 3:
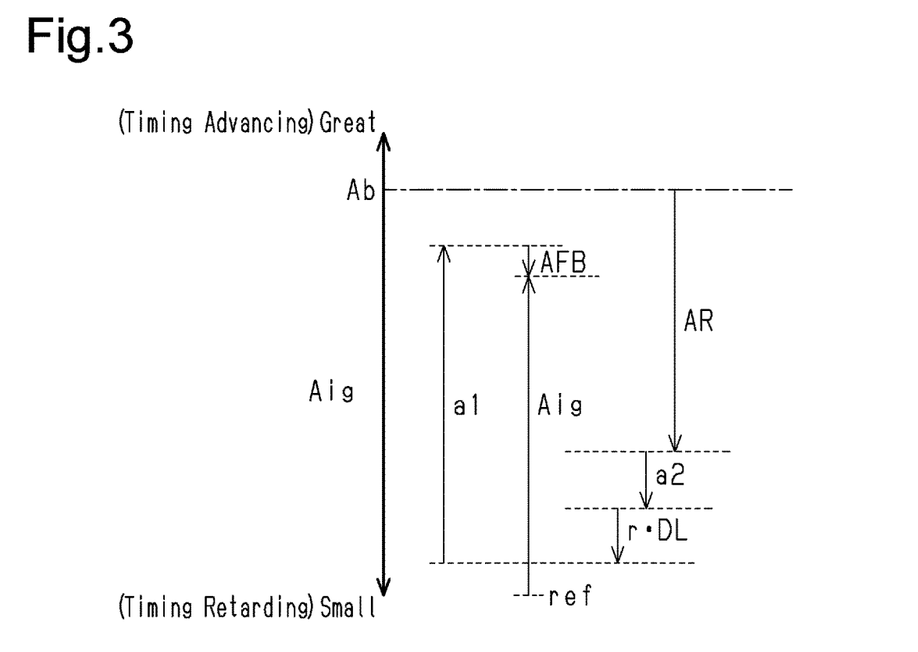
FIG. 3 is a diagram showing a method for setting ignition timing.

FIG. 3 shows ignition timing Aig set by the ignition timing adjusting process M16 in the low load region. The most advanced ignition timing Ab shown in FIG. 3 is the retarded one of MBT ignition timing and a first knock limit point. The MBT ignition timing is the ignition timing at which the maximum torque is obtained (maximum torque ignition timing). The first knock limit point is the advancement limit value of the ignition timing (knock limit ignition timing) at which knocking can be restrained within an allowable level under the assumed best conditions when a large-octane-number fuel, which has a large knock limit value, is used.

A retardation difference AR is the difference between the most advanced ignition timing Ab and a second knock limit point. The second knock limit point is the advancement limit of the ignition timing (knock limit ignition timing) at which knocking can be restrained within an allowable level if deposit accumulation is completely absent when a small-octane-number fuel, which has a small knock limit value, is used.

In the low load region, the ignition timing Aig is set to a value obtained by shifting the second knock limit point by an amount corresponding to the sum of a first learning value a1, a second learning value a2, the product of a third learning value r and a deposit maximum retardation amount DL, and a feedback adjustment amount AFB. The feedback adjustment amount AFB is an adjustment amount for advancing the ignition timing within a range in which knocking can be suppressed by feedback control based on the output signal Sn of the knocking sensor 64. The first learning value a1 is updated in all the load regions to reduce the absolute value of the feedback adjustment amount AFB for each of regions divided according to the rotation speed NE. The second learning value a2 is updated in the low load region and the medium load region to reduce the absolute value of the feedback adjustment amount AFB for each of regions divided according to the rotation speed NE and the charging efficiency η. The second learning value a2 is a value obtained mainly by learning the amount resulting from the EGR rate in the feedback adjustment amount AFB. In the present embodiment, the EGR rate becomes maximum in the medium load region. Accordingly, the influence of the EGR rate on knocking in the high load region is smaller than that in the medium load region and the like. The second learning value a2 is thus not used in the high load region.

The deposit maximum retardation amount DL is the difference between the second knock limit point and the third knock limit point. The third knock limit point is the advancement limit of the ignition timing (knock limit ignition timing) at which knocking can be restrained within an allowable level when the deposit accumulation has reached the assumed maximum while a small-octane-number fuel, which has a small knock limit value, is used.

The third learning value r is updated in the low load region to reduce the absolute value of the feedback adjustment amount AFB for each of regions divided according to the rotation speed NE and the charging efficiency η. Changes in the susceptibility to knocking due to deposit are particularly noticeable in the low load region. Therefore, the third learning value r is updated only in the low load region.

In FIG. 3, the second learning value a2, the product of the third learning value r and the deposit maximum retardation amount DL, and the feedback adjustment amount AFB are described as timing retarding correction amounts, but the second learning value a2 and the feedback adjustment amount AFB can be timing advancing values. In the present embodiment, timing advancing values are positive values. In addition, the ignition timing Aig is defined by the amount of advancement relative to the reference timing ref, which is more timing retarding than the third knock limit point.

Figure 4:
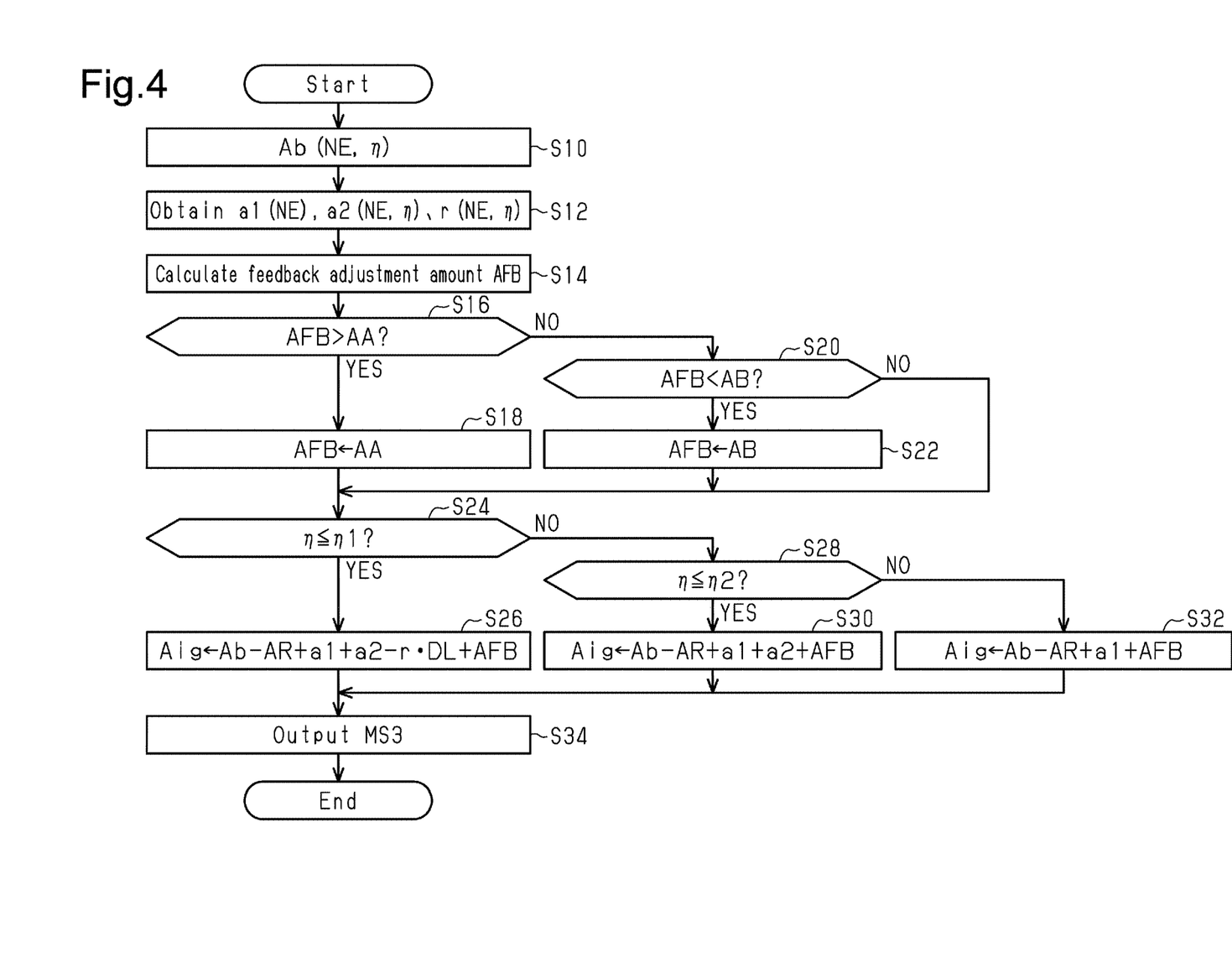
FIG. 4 is a flowchart showing a procedure of an ignition timing control process.

FIG. 4 shows the procedure of the processes particularly related to adjustment of the ignition timing Aig in the ignition timing adjusting process M16. The processes shown in FIG. 4 are executed by the CPU 52 repeatedly executing programs stored in the ROM 54 at a predetermined interval.

In the following description, the number of each step is represented by the letter S followed by a numeral.

In the series of processes shown in FIG. 4, the CPU 52 first calculates the most advanced ignition timing Ab based on the operating point of the internal combustion engine 10 (S10). Specifically, the ROM 54 stores in advance map data having the rotation speed NE and the charging efficiency η, which define the operating point of the internal combustion engine 10, as input variables and the most advanced ignition timing Ab as an output variable. In this state, the CPU 52 acquires the most advanced ignition timing Ab through map calculation. The map data refers to a data set of discrete values of an input variable and values of an output variable each corresponding to a value of the input variable. When the value of an input variable matches with one of the values of the input variable on the map data, the map calculation uses the corresponding value of the output variable of the map data as the calculation result. When the value of an input variable does not match with any of the values of the input variable on the map data, a value obtained by interpolation of multiple values of the output variable included in the map data is used as the calculation result.

Next, the CPU 52 acquires the first learning value a1, the second learning value a2, and the third learning value r, which are stored in the backup RAM 56 (S12). The CPU 52 selectively acquires the first learning value a1 corresponding to the current rotation speed NE among the first learning values a1 for each rotation speed NE stored in the backup RAM 56. Also, the CPU 52 selectively acquires the second learning value a2 corresponding to the current rotation speed NE and charging efficiency η among the second learning values a2 for each rotation speed NE and charging efficiency η stored in the backup RAM 56. Likewise, the CPU 52 selectively acquires the third learning value r corresponding to the current rotation speed NE and charging efficiency η among the third learning values r for each rotation speed NE and charging efficiency η stored in the backup RAM 56.

Next, the CPU 52 calculates the feedback adjustment amount AFB based on the output signal Sn of the knocking sensor 64 (S14). Specifically, if the vibration intensity based on the output signal Sn is greater than or equal to a predetermined value, the CPU 52 updates the feedback adjustment amount AFB by a timing retarding update amount. The CPU 52 increases the absolute value of the update amount as the amount by which the vibration intensity exceeds the predetermined value increases. Also, if the vibration intensity is less than or equal to a specified value (specified value<predetermined value), the CPU 52 updates the feedback adjustment amount AFB to the timing advancing side by a predetermined update amount at a time. That is, when the vibration intensity becomes greater than or equal to the predetermined value so that the feedback adjustment amount AFB is set to a timing retarding value, the feedback adjustment amount AFB will not immediately return to the original value even if the vibration intensity is less than or equal to the predetermined value in the subsequent calculation cycle of the feedback adjustment amount AFB. Also, if the vibration intensity is greater than or equal to the predetermined value in the calculation cycle immediately after the feedback adjustment amount AFB is set to a timing retarding value, the feedback adjustment amount AFB is set to a more timing retarding value. That is, the process of updating the retardation amount of the feedback adjustment amount AFB includes an integral action.

Next, the CPU 52 determines whether the feedback adjustment amount AFB is more timing advancing than an advancing-side upper limit AA (S16). If the feedback adjustment amount AFB is more timing advancing than the advancing-side upper limit AA (S16: YES), the CPU 52 substitutes the advancing-side upper limit AA for the feedback adjustment amount AFB (S18). In contrast, when the feedback adjustment amount AFB is less than or equal to the advancing-side upper limit AA (S16: NO), the CPU 52 determines whether the feedback adjustment amount AFB is more timing retarding than a retarding-side upper limit AB (S20). If the feedback adjustment amount AFB is more timing retarding than the retarding-side upper limit AB (S20: YES), the CPU 52 substitutes the retarding-side upper limit AB for the feedback adjustment amount AFB (S22).

When the processes of S18 and S22 are completed or when the determination of S20 is negative, the CPU 52 determines whether the charging efficiency η is less than or equal to a predetermined amount η1 (S24). This process determines whether the operation region is in the low load region. If the charging efficiency η is less than or equal to the predetermined amount η1 (S24: YES), the CPU 52 substitutes Ab−AR+a1+a2−r·DL+AFB for the ignition timing Aig (S26). In view of the fact that the value of the second knock limit point may differ depending on the operating point of the internal combustion engine 10, the CPU 52 variably sets the retardation difference AR based on the operating point of the internal combustion engine 10. Specifically, the ROM 54 stores in advance map data having the rotation speed NE and the charging efficiency η, which define the operating point of the internal combustion engine 10, as input variables and the retardation difference AR as an output variable. In this state, the CPU 52 acquires the retardation difference AR through map calculation. The CPU 52 variably sets the deposit maximum retardation amount DL in accordance with the operating point of the internal combustion engine 10. Specifically, the ROM 54 stores in advance map data having the rotation speed NE and the charging efficiency η, which define the operating point of the internal combustion engine 10, as input variables and the deposit maximum retardation amount DL as an output variable. In this state, the CPU 52 acquires the deposit maximum retardation amount DL through map calculation.

In contrast, when the charging efficiency η is greater than the predetermined amount η1 (S24: NO), the CPU 52 determines whether the charging efficiency η is less than or equal to a specified amount η2, which is greater than the predetermined amount η1 (S28). This process determines whether the operation region is in the medium load region. If the charging efficiency η is less than or equal to the specified amount η2 (S28: YES), the CPU 52 substitutes Ab−AR+a1+a2+AFB for the ignition timing Aig (S30). In contrast, if the charging efficiency η is greater than the specified amount η2 (S28: NO), the CPU 52 substitutes Ab−AR+a1+AFB for the ignition timing Aig (S32).

When the processes of S26, S30, and S32 are completed, the CPU 52 outputs the operation signal MS3 to the ignition device 26 to generate spark discharge at the ignition timing Aig (S34). When the process of S34 is completed, the CPU 52 temporarily ends the series of processes shown in FIG. 4.

Figure 5:
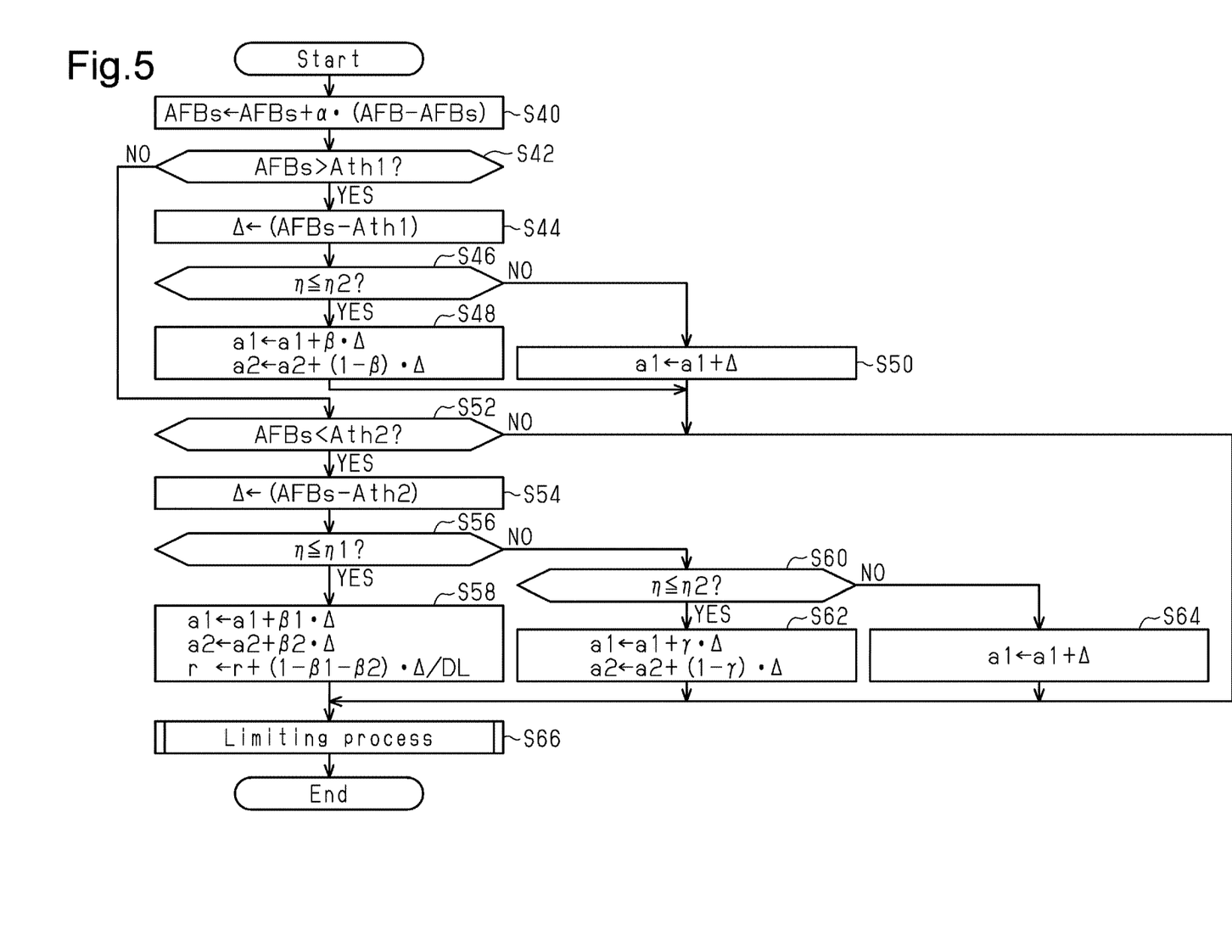
FIG. 5 is a flowchart showing a procedure of a learning process of ignition timing.

FIG. 5 shows the procedure of the update process for the learning values in the ignition timing adjusting process M16. The processes shown in FIG. 5 are executed by the CPU 52 repeatedly executing programs stored in the ROM 54 at a predetermined interval.

In the series of processes shown in FIG. 5, the CPU 52 first updates a learning adjustment amount AFBs, which is the exponential moving average process value of the feedback adjustment amount AFB (S40). Specifically, the CPU 52 updates the learning adjustment amount AFBs to AFBs+ α·(AFB−AFBs) by using a value α, which is greater than 0 and less than 1. Next, the CPU 52 determines whether the learning adjustment amount AFBs is greater than an advancing update threshold Ath1 (S42). When the learning adjustment amount AFBs is greater than the advancing update threshold Ath1 (S42: YES), the CPU 52 substitutes a value obtained by subtracting the advancing update threshold Ath1 from the learning adjustment amount AFBs for a correction amount Δ (S44).

Then, the CPU 52 determines whether the charging efficiency η is less than or equal to the specified amount η2 (S46). If the charging efficiency η is less than or equal to the specified amount η2 (S46: YES), the CPU 52 updates the first learning value a1 by adding β·Δ to the first learning value a1. Also, the CPU 52 updates the second learning value a2 by adding (1−β)·Δ to the second learning value a2 (S48). The division number β is greater than or equal to 0 and less than or equal to 1. The division number β may be variably set in accordance with the operating point of the internal combustion engine 10 or in accordance with the first learning value a1 and the second learning value a2. The cases in which the division number β is 0 or 1 are limited to cases in which the first learning value a1 or the second learning value a2 has reached a predetermined advancing-side learning upper limit.

If the charging efficiency η is greater than the specified amount η2 (S46: NO), the CPU 52 updates the first learning value a1 by adding the correction amount Δ to the first learning value a1 (S50).

When the determination in S42 is negative, the CPU 52 determines whether the learning adjustment amount AFBs is more timing retarding than a retarding update threshold Ath2 (S52). The retarding update threshold Ath2 is a negative value. When the learning adjustment amount AFBs is more timing retarding than the retarding update threshold Ath2 (S52: YES), the CPU 52 substitutes a value obtained by subtracting the retarding update threshold Ath2 from the learning adjustment amount AFBs for the correction amount Δ (S54).

Then, the CPU 52 determines whether the charging efficiency η is less than or equal to the predetermined amount η1 (S56). If the charging efficiency η is less than or equal to the predetermined amount η1 (S56: YES), the CPU 52 updates each of the first learning value a1, the second learning value a2, and the third learning value r based on the correction amount Δ (S58). Division numbers β1 and β2 are greater than or equal to 0 and less than or equal to 1, and β1+β2 is less than or equal to 1. Using the division numbers β1 and β2, the CPU 52 updates the first learning value a1 by adding β1·Δ to the first learning value a1. Also, the CPU 52 updates the second learning value a2 by adding β2·Δ to the second learning value a2. Further, the CPU 52 updates the third learning value r by adding (1−β1−β2)·Δ/DL to the third learning value r. The cases in which the division numbers β1 and β2 are 0 or 1 are limited to cases in which any one of the first learning value a1, the second learning value a2, and the third learning value r has reached the retarding-side learning upper limit, for example, a case in which the third learning value r is 1.

In contrast, when the charging efficiency η is greater than the predetermined amount η1 (S56: NO), the CPU 52 determines whether the charging efficiency η is less than or equal to the specified amount η2 (S60). If the charging efficiency η is less than or equal to the specified amount η2 (S60: YES), the CPU 52 updates the first learning value a1 by adding γ·Δ to the first learning value a1. Also, the CPU 52 updates the second learning value a2 by adding (1−γ)·Δ to the second learning value a2 (S62). The division number γ is greater than or equal to 0 and less than or equal to 1. The cases in which the division number γ is 0 or 1 are limited to cases in which the first learning value a1 or the second learning value a2 has reached a predetermined retarding-side learning upper limit.

In contrast, if the charging efficiency η is greater than the specified amount η2 (S60: NO), the CPU 52 updates the first learning value a1 by adding the correction amount Δ to the first learning value a1 (S64).

When the processes of S58, S62, S64 are completed, the CPU 52 executes a limiting process (S66).

Figure 6:
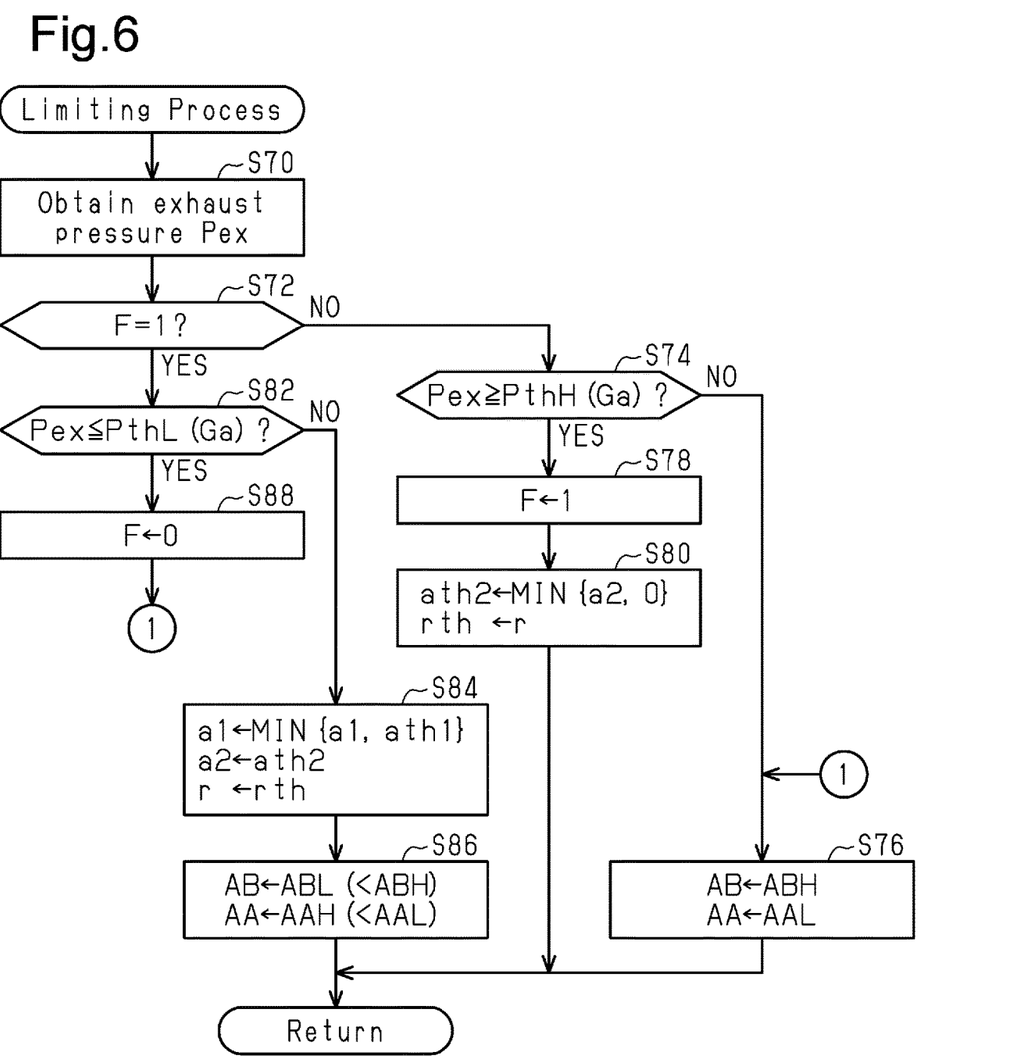
FIG. 6 is a flowchart showing a procedure of a learning limiting process.

FIG. 6 shows the procedure of the limiting process.

In the series of processes shown in FIG. 6, the CPU 52 first acquires the exhaust pressure Pex (S70). Next, the CPU 52 determines whether a limitation flag F is 1 (S72). The limitation flag F is 1 when the process for limiting update of the learning values due to the exhaust pressure Pex is being executed, and is 0 when the process for limiting update of the learning values is not being executed. If the limitation flag F is 0 (S72: NO), the CPU 52 determines whether the exhaust pressure Pex is higher than or equal to a first threshold PthH (S74). This process determines whether knocking is less likely to occur due to clogging of the GPF 36. That is, if clogging occurs in the GPF 36, the pressure of the exhaust gas flowing into the EGR passage 40 increases excessively. As a result, the actual EGR rate becomes greater than the target value of the EGR rate set by the EGR control process M10, so that knocking is less likely to occur. The first threshold PthH is set to a value at which the control accuracy of the EGR rate by the EGR control process M10 is out of the allowable range. The CPU 52 sets the first threshold PthH such that the value of the first threshold PthH increases as the intake air amount Ga increases.

When the exhaust pressure Pex is lower than the first threshold PthH (S74: NO), the CPU 52 substitutes a normal value AAL for the advancing-side upper limit AA and substitutes a normal value ABH for the retarding-side upper limit AB (S76).

In contrast, when the exhaust pressure Pex is higher than or equal to the first threshold PthH (S74: YES), the CPU 52 substitutes 1 for the limitation flag F (S78). Then, the CPU 52 substitutes the smaller one of the current second learning value a2 and 0 for a second limit value ath2 and substitutes the current third learning value r for a third limit value rth (S80). The second limit value ath2 is a value determined for each of regions divided according to the rotation speed NE and the charging efficiency η. Therefore, in the process of S80, the second limit value ath2 is determined for each divided region. Likewise, the third limit value rth is determined for each of regions divided according to the rotation speed NE and the charging efficiency η. Therefore, in the process of S80, the third limit value rth is determined for each divided region.

If the limitation flag F is 1 (S72: YES), the CPU 52 determines whether the exhaust pressure Pex is lower than or equal to a second threshold PthL (S82). The second threshold PthL is smaller than the first threshold PthH. The second threshold PthL is set to a value at which the control accuracy of the EGR rate by the EGR control process M10 is within the allowable range. The CPU 52 sets the second threshold PthL such that the value of the second threshold PthL decreases as the intake air amount Ga increases. When the exhaust pressure Pex is higher than the second threshold PthL (S82: NO), the CPU 52 substitutes the smaller one of the current first learning value a1 and an advancing-side guard value ath1 for the first learning value a1, substitutes the second limit value ath2 for the second learning value a2, and substitutes the third learning value r for the third limit value rth (S84). In the present embodiment, taking into consideration the fact that knocking becomes more likely to occur due to time-dependent change, the initial value of the first learning value a1 is set to a value that is more timing advancing by a predetermined amount, and the advancing-side guard value ath1 is set to a timing advancing value smaller than the initial value.

The reason for limiting the first learning value a1 to or below the advancing-side guard value ath1 is as follows. That is, if the exhaust pressure Pex is excessively high, knocking becomes less likely to occur due to the EGR rate being greater than the target value, so that the first learning value a1 may become an excessively timing advancing value. The reason for fixing the second learning value a2 and the third learning value r is as follows. That is, if the exhaust pressure Pex is excessively high, knocking becomes less likely to occur due to the EGR rate being greater than the target value, so that values in the case in which the EGR rate is normal cannot be learned.

Next, the CPU 52 substitutes an enlarging value AAH, which is greater than the normal value AAL, for the advancing-side upper limit AA, and substitutes an enlarging value ABL, which is smaller than the normal value ABH, for the retarding-side upper limit AB (S86). The enlarging value ABL is a value for enlarging the retarding-side upper limit AB to the timing retarding side.

The feedback adjustment amount AFB is made to have a more timing retarding value by substituting the enlarging value ABL for the retarding-side upper limit AB. This is in view of the fact that the update of the second learning value a2 and the third learning value r is prohibited by the process of S84. That is, when update of the second learning value a2 and the third learning value r is prohibited in the process of S84 even if knocking is likely to occur due to some factor, the ignition timing Aig is less likely to be retarded as compared to a case in which update of the second learning value a2 and the third learning value r is not prohibited. In order to cope with such cases, the enlarging value ABL is substituted for the retarding-side upper limit AB so that the feedback adjustment amount AFB has a more timing retarding value by the retarding-side upper limit AB.

Also, the feedback adjustment amount AFB is made more timing advancing by substituting the enlarging value AAH for the advancing-side upper limit AA. This is in view of the fact that timing advancing update of the first learning value a1 is prohibited by the process of S84 and update of the second learning value a2 and the third learning value r is prohibited. That is, if timing advancing update is prohibited, the ignition timing Aig becomes less likely to be advanced. Therefore, for the purpose of achieving more efficient ignition timing, the enlarging value AAH is substituted for the advancing-side upper limit AA if knocking does not occur, so that the feedback adjustment amount AFB becomes a more timing advancing value.

In contrast, when the exhaust pressure Pex is lower than or equal to the second threshold PthL (S82: YES), the CPU 52 substitutes 0 for the limitation flag F (S88). When the processes of S76, S80, and S86 are completed, the CPU 52 completes the process of S66 of FIG. 5 and temporarily ends the series of processes of FIG. 5. However, the CPU 52 updates the feedback adjustment amount AFB based on the updated amounts of the learning values before temporarily ending the series of processes of FIG. 5. That is, for example, when having completed the processes of S48, S50, S58, S62, S64 and not having completed the process of S84, the CPU 52 updates the feedback adjustment amount AFB by subtracting the correction amount Δ from the feedback adjustment amount AFB.

Operation and advantages of the first embodiment will now be described.

Figure 7:
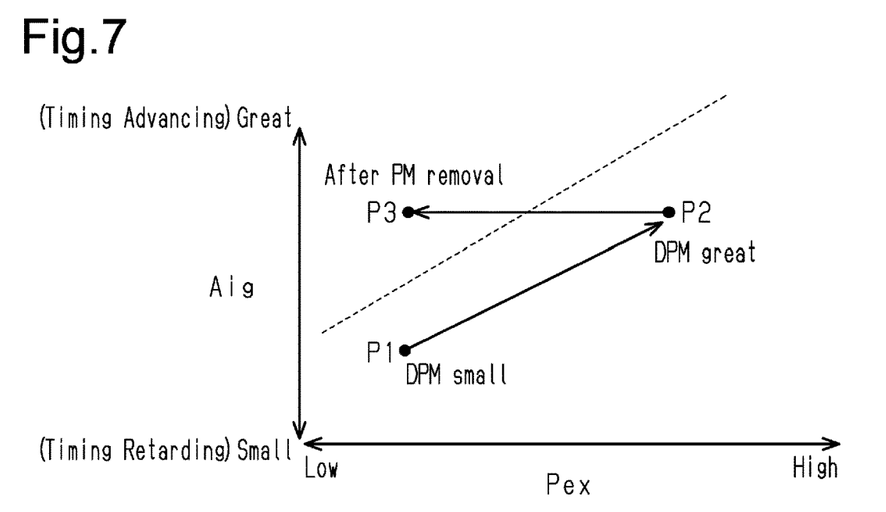
FIG. 7 is a diagram showing an operation of the first embodiment.

The broken line in FIG. 7 shows the relationship between the ignition timing that is the advancement limit of the range in which knocking does not occur and the exhaust pressure Pex. As shown in FIG. 7, when the exhaust pressure Pex increases, the ignition timing that is the advancement limit without knocking becomes a more advanced value.

Point P1 in FIG. 7 represents the ignition timing Aig when the PM deposition amount DPM is small. Point P2 in FIG. 7 represents ignition timing Aig when the PM deposition amount DPM has increased. When the PM deposition amount DPM increases, the CPU 52 executes the PM removing process. The exhaust pressure Pex decreases when the PM trapped by the GPF 36 is burned and removed by the PM removing process. In this case, if the first learning value a1 or the second learning value a2 is set to an excessively timing advancing value, knocking is likely to occur. However, since the learning adjustment amount AFBs is the exponential moving average process value of the feedback adjustment amount AFB, the change rates of the first learning value a1 and the second learning value a2 are smaller than the change rate of the feedback adjustment amount AFB. Thus, the ignition timing Aig immediately after the PM removing process is the timing represented by point P3. Therefore, even after knocking occurs, the ignition timing Aig cannot be quickly retarded.

In contrast, in the first embodiment, when the exhaust pressure Pex increases, timing advancing update of the first learning value a1 is prohibited, and update of the second learning value a2 is prohibited. For this reason, the first learning value a1 and the second learning value a2 are unlikely to be excessively timing advancing values immediately before the PM removing process is executed. Therefore, after the PM removing process, the ignition timing Aig will not be excessively advanced in relation to the appropriate timing for suppressing knocking.

The first embodiment has the following advantages.

(1) When the exhaust pressure Pex is high, the flow rate of exhaust gas flowing from the exhaust passage 32 into the intake passage 12 through the EGR passage 40 tends to be greater than when the exhaust pressure Pex is low. Also, when the flow rate of exhaust gas flowing into the intake passage 12 increases, knocking is less likely to occur. Thus, the learning values tend to be updated to the timing advancing side. When the factor that has increased the exhaust pressure Pex disappears with the learning values updated to the timing advancing side, the flow rate of the exhaust gas flowing into the intake passage 12 decreases. Knocking is thus likely to occur and the learning values may be values corresponding to excessively advanced timing in relation to an appropriate value. In this respect, according to first embodiment, when the exhaust pressure Pex is high, timing advancing update of the learning values is limited as compared to a case in which the exhaust pressure Pex is low. As a result, when the cause of the increase in the exhaust pressure Pex is eliminated, it is possible to prevent the learning values from becoming an excessively timing advancing value in relation to an appropriate value.

(2) The first embodiment prohibits the first learning value a1 from being updated to be more timing advancing than the advancing-side guard value ath1. Accordingly, it is possible to update the first learning value a1 to the timing retarding side in a case in which knocking is likely to occur for some reason. Also, the first embodiment prohibits update of the second learning value a2 in a case in which the exhaust pressure Pex is higher than or equal to the threshold. This prevents the second learning value a2 from being updated improperly due to the adjustment amount of feedback control operation when exhaust pressure Pex is high and abnormal.

(3) According to the first embodiment, if the exhaust pressure Pex is higher than or equal to the threshold, the third learning value r is fixed. This prevents the third learning value r from being updated improperly due to the feedback adjustment amount AFB when the exhaust pressure Pex is abnormally high.

(4) If the exhaust pressure Pex is higher than or equal to the threshold, stops not only timing advancing update of the second learning value a2, but also timing retarding update. For this reason, the second learning value a2 may be a timing advancing value in relation to an appropriate value for suppressing knocking. If the second learning value a2 is a timing advancing value, the feedback adjustment amount AFB may not be sufficient for appropriate ignition timing for suppressing knocking. In this respect, the first embodiment enlarges the retarding-side upper limit AB to cause the feedback adjustment amount AFB to be a more timing retarding value than that in a case in which the retarding-side upper limit AB is not enlarged. This further effectively suppresses knocking.

(5) When the update limiting process is executed, the learning values may be more timing retarding than that in a case in which the update limiting process is not executed. Thus, it is difficult to advance the ignition timing. In this respect, the first embodiment is capable of advancing the ignition timing by enlarging the advancing-side upper limit AA when the update limiting process is executed. This maximizes the torque within the range in which knocking can be suppressed.

(6) When the amount of particulate matter trapped by a filter 36 increases, the pressure of the exhaust gas flowing into the EGR passage 40 increases. In contrast, the pressure of the exhaust gas flowing into the EGR passage 40 is reduced by the removing process. For this reason, since the flow rate of exhaust gas flowing from the EGR passage 40 into the intake passage 12 is reduced as compared to that before the removing process, knocking is more likely to occur. Thus, if the update limiting process is not executed, the learning values become excessively timing advancing values immediately after the removing process, and there is a possibility that the ignition timing cannot be retarded quickly to a value that can suppress knocking. The update limiting process is therefore of a great utility value.

Second Embodiment

A second embodiment will now be described with reference to the drawings. The differences from the first embodiment will mainly be discussed.

Figure 8:
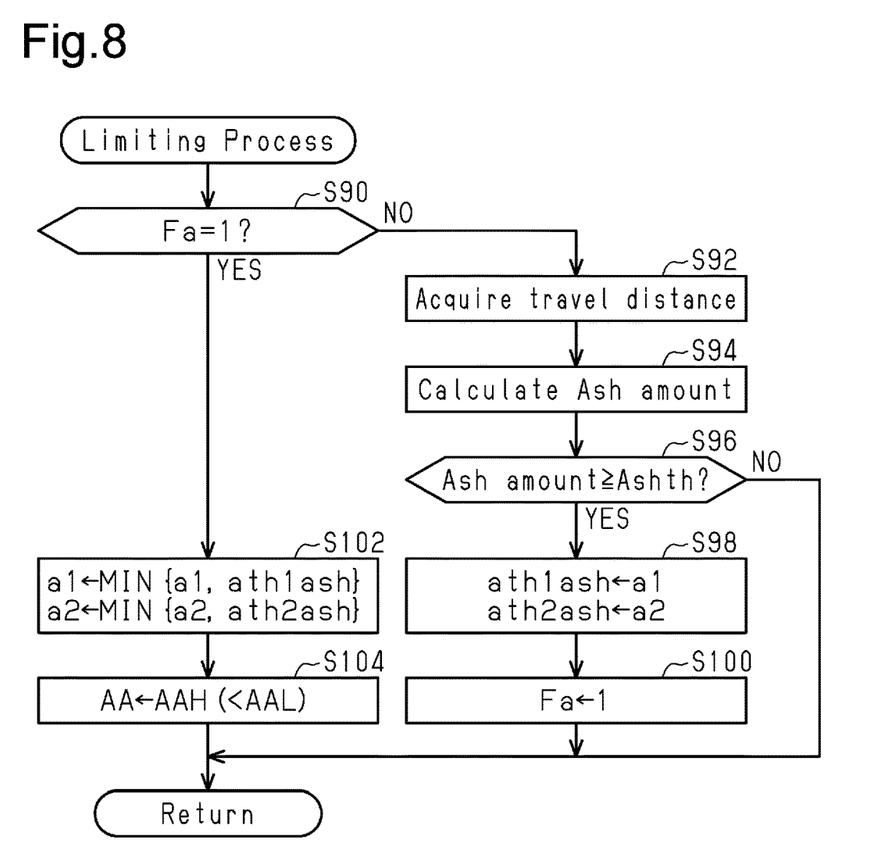
FIG. 8 is a flowchart showing a procedure of a learning limiting process according to a second embodiment of the present disclosure.

In the second embodiment, the limiting process includes processes shown in FIG. 8 in addition to the processes shown in FIG. 6. The processes shown in FIG. 8 are implemented by the CPU 52 executing programs stored in the ROM 54.

In the series of processes shown in FIG. 8, the CPU 52 first determines whether an Ash limitation flag Fa is 1 (S90). The Ash limitation flag Fa is 1 when update limitation is applied to the learning values based on an Ash amount, which will be discussed below. The Ash limitation flag Fa is 0 when such update limitation is not applied to the learning values. If the Ash limitation flag Fa is 0 (S90: NO), the CPU 52 acquires the travel distance of the vehicle (S92). Next, the CPU 52 calculates the amount of soot deposited in the GPF 36 (Ash amount) based on the travel distance (S94). Soot is generated by some of the lubricant of the internal combustion engine 10 that flows out into the exhaust gas. Therefore, the longer the total operating time of the internal combustion engine 10, the greater the Ash amount becomes. In the present embodiment, the total operating time of the internal combustion engine 10 is acquired based on the travel distance. Specifically, the ROM 54 stores in advance map data having the travel distance as an input variable and the Ash amount as an output variable. In this state, the CPU 52 acquires the Ash amount through map calculation.

Next, the CPU 52 determines whether the Ash amount is greater than or equal to a threshold Ashth (S96). If the Ash amount is greater than or equal to the threshold Ashth (S96: YES), the CPU 52 substitutes the current first learning value a1 for a first Ash limit value ath1ash and substitutes the second learning value a2 for a second Ash limit value ath2ash (S98). The first Ash limit value ath1ash is set for each rotation speed NE. The current first learning value a1 is the value for the corresponding rotation speed NE. Also, the second Ash limit value ath2ash is set for each of regions divided according to the rotation speed NE and the charging efficiency η. The current second learning value a2 is the value for the corresponding region.

Next, the CPU 52 sets the Ash limitation flag Fa to 1 (S100). When the Ash limitation flag Fa is 1 (S90: YES), the CPU 52 substitutes the smaller one of the first learning value a1 and the first Ash limit value ath1ash for the first learning value a1 and substitutes the smaller one of the second learning value a2 and the second Ash limit value ath2ash for the second learning value a2 (S102). Then, the CPU 52 substitutes the enlarging value AAH for the advancing-side upper limit AA (S104). This process is intended to compensate for the fact that the ignition timing Aig cannot be easily advanced due to the process of S102. In the present embodiment, when the Ash limitation flag Fa is 1, the CPU 52 does not execute the process of substituting the normal value AAL for the advancing-side upper limit AA in the process of S76 even if the negative determination is made in the process of S74 of FIG. 6 or the process of S88 is completed.

When the processes of S100 and S104 are completed or when the determination in S96 is negative, the CPU 52 temporarily ends the series of processes shown in FIG. 8. Thus, in the second embodiment, the CPU 52 prohibits timing advancing update of the learning values when the Ash amount increases. For this reason, even if the pressure of exhaust gas flowing into the EGR passage 40 increases due to increase in the Ash amount and knocking becomes unlikely to occur, the learning values are prevented from being updated to excessively timing advancing values. The soot deposited in the GPF 36 cannot be removed by the PM removing process. However, if the learning values become excessively timing advancing values immediately after the GPF 36 is replaced, knocking may not be eliminated quickly. In contrast, in the second embodiment, knocking that occurs after the replacement of the GPF 36 is dealt with quickly by prohibiting timing advancing update of the learning values when the Ash amount increases.

When replacing the GPF 36, it is desirable to forcibly initialize the Ash limitation flag Fa.

The second embodiment has the following advantages.

(7) As the internal combustion engine 10 operates, some of lubricant is discharged to the exhaust passage 32 and deposited on the filter 36 as ash. When ash is deposited, the pressure of the exhaust gas flowing into the EGR passage 40 increases, so that the flow rate of the exhaust gas flowing from the EGR passage 40 into the intake passage 12 increases. Accordingly, knocking is less likely to occur. For this reason, the learning values tend to be updated to timing advancing values. If the filter 36 is replaced when the learning values have been updated to timing advancing values, the learning values may become excessively timing advancing values in relation to an appropriate value for suppressing knocking. In this respect, the second embodiment limits timing advancing update of the learning values when the pressure of the exhaust gas flowing into the EGR passage 40 is significantly increased by the ash that clogs the filter 36 due to the operating time becoming a predetermined time or longer. This prevents the learning values from becoming excessively timing advancing values in relation to an appropriate value for suppressing knocking after the filter 36 is replaced.

(8) When a time-dependent limiting process is executed, the learning values are not updated to the timing advancing side, so that the timing is restricted from being advanced. In this respect, the advancing-side upper limit AA is enlarged when the time-dependent limiting process is executed in the second embodiment, the ignition timing can be more advanced than that in a case in which the advancing-side upper limit AA is not enlarged.

<Correspondence>

The feedback process, which is a feature of claims 1 to 3, corresponds to the processes shown in FIGS. 4 to 6 and 8. Also, the update process corresponds to the processes of S40 to S64, and the setting process corresponds to the processes of S26, S30, and S32. The update limiting process corresponds to the process of S84. The ignition timing controller corresponds to the controller 50. The adjustment amount limiting process, which is a feature of claims 4 and 5, corresponds to the processes of S16 to S22. The enlarging process corresponds to the process of S86. The filter, which is a feature of claim 6, corresponds to the GPF 36. The removing process corresponds to the process of the PM removing process M14. The time-dependent liming process, which is a feature of claim 7, corresponds to the process of S102. The enlarging process corresponds to the process of S104.

The above-described embodiments may be modified as follows. The above-described embodiments and the following modifications can be combined as long as the combined modifications remain technically consistent with each other.

Regarding Enlarging Process

In the process of S86 in FIG. 6, the retarding-side upper limit AB is enlarged to the timing retarding side and the advancing-side upper limit AA is enlarged to the timing advancing side. However, the present disclosure is not limited to this. For example, while enlarging the retarding-side upper limit AB to the timing retarding side, the advancing-side upper limit AA may remain unchanged.

Regarding First Update Process

In the above-described embodiments, the first learning value a1 is learned for each of the regions divided according to the rotation speed NE. However, the present disclosure is not limited to this. For example, the first learning value a1 may be learned for each of regions divided according to the rotation speed NE and a load parameter such as the charging efficiency η. It is not essential to allow the first learning value a1 to be learned as different values for each of the regions divided according to the rotation speed and a load parameter.

Regarding Second Update Process

In the above-described embodiments, the second learning value a2 is learned for each of the regions divided according to the rotation speed NE and a load parameter. However, the present disclosure is not limited to this. For example, the second learning value a2 may be learned for each of regions divided according to a load parameter without using the rotation speed NE. It is not essential to allow the second learning value a2 to be learned as different values for each of the regions divided according to the rotation speed and a load parameter.

In the above-described embodiments, the second learning value a2 is updated when the charging efficiency η is less than or equal to the specified amount η2. However, the present disclosure is not limited to this. For example, the second learning value a2 may be updated regardless of the value of the charging efficiency η.

Regarding Third Update Process

In the above-described embodiments, the third learning value r is learned for each of the regions divided according to the rotation speed NE and a load parameter. However, the present disclosure is not limited to this. For example, the third learning value r may be learned for each of regions divided according to a load parameter without using the rotation speed NE. It is not essential to allow the third learning value r to be learned as different values for each of the regions divided according to the rotation speed and a load parameter.

If the feedback adjustment amount AFB is a timing advancing value, a process may be executed to update the feedback adjustment amount AFB to a smaller value on condition that the third learning value r is greater than or equal to 0.

In the above-described embodiments, the third learning value r is updated when the charging efficiency η is less than or equal to the predetermined amount η1. However, the present disclosure is not limited to this. For example, the third learning value r may be updated when the charging efficiency η is less than or equal to the specified amount η2. Alternatively, the third learning value r may be updated regardless of the value of the charging efficiency η.

Regarding Update Process

In the above-described embodiments, the learning adjustment amount AFBs is set to the exponential moving average process value of the feedback adjustment amount AFB. However, the present disclosure is not limited to this. For example, the learning adjustment amount AFBs may be set to a low-pass filter process value of the feedback adjustment amount AFB. Further, for example, without executing the calculation process of the learning adjustment amount AFBs, the correction amount Δ may be calculated by using the feedback adjustment amount AFB instead of the learning adjustment amount AFBs in the processes S42, S44, S52, S54. Then, after the absolute value of the correction amount Δ is reduced, the learning values may be updated based on the reduced value. While this process suppresses the noise component contained in the feedback adjustment amount AFB from being reflected in the learning values, the change rate (absolute value) of the learning values becomes less than the change rate (absolute value) of the feedback adjustment amount AFB.

Third Learning Value

In the above-described embodiments, the third learning value r is greater than or equal to 0 and less than or equal to 1. However, the present disclosure is not limited to this. For example, the third learning value may be an amount equivalent to r·DL, and may be a value greater than or equal to 0 and less than or equal to the maximum retardation amount DL.

Regarding Learning Values

In the above-described embodiments, the initial value of the first learning value a1 is set to a timing advancing value. However, the present disclosure is not limited to this.

The learning values are not limited the first learning value a1, the second learning value a2, and the third learning value r. For example, the learning values may have a single value.

Regarding Time-Dependent Limiting Process

The above-described embodiments prohibits timing advancing update of first learning value a1 and the second learning value a2 from the values at the time when an affirmative determination is made in the process of S96. However, the present disclosure is not limited to this. For example, the first learning value a1 and the second learning value a2 may be prohibited from being updated to be more timing advancing than an upper limit that is set independently of the value at the time when an affirmative determination is made in the process of S96.

In the above-described embodiments, the travel distance is regarded as the operating time of the internal combustion engine 10, and timing advancing update of the learning values is limited. However, the present disclosure is not limited to this. For example, the operating time itself may be acquired, timing advancing update of the learning values may be limited based on the acquired operating time.

Regarding Update Limiting Process

In the above-described embodiments, the advancing-side guard value ath1 may be more gradually changed to the timing retarding side when the value of the exhaust pressure Pex is great than when the value is small.

In the above-described embodiments, when the exhaust pressure Pex is higher than or equal to the first threshold PthH, the first learning value a1 is limited to be less than or equal to the advancing-side upper limit AA. However, the present disclosure is not limited to this.

In the above-described embodiments, in the process of limiting the update of the second learning value a2 when the exhaust pressure Pex is higher than or equal to the first threshold PthH, the second learning value a2 is fixed to the more timing retarding one of the value at the time when the second learning value a2 becomes greater than or equal to the first threshold PthH and 0. For example, the second learning value a2 may be fixed to the value at the moment.

In the above-described embodiments, the process for fixing the third learning value r is executed. However, the update of the third learning value r does not required to be limited. Also, for example, in a case in which the feedback adjustment amount AFB is a timing advancing value as described in the section Regarding Third Update Process, a process may executed to prohibit only the update for reducing the third learning value when the third learning value r is reduced on condition that the third learning value r is greater than or equal to 0.

In the above-described embodiments, the limitation on update of the learning values is cancelled when the exhaust pressure Pex is lower than or equal to the second threshold PthL. However, the present disclosure is not limited to this. For example, even if the exhaust pressure Pex is lower than or equal to the second threshold PthL, the limitation may be continued until an activation switch of the vehicle is turned off. The activation switch of the vehicle is a switch that switches between a state in which the user can run the vehicle by operating the accelerator and the steering wheel and a different state. The activation switch corresponds to the ignition switch in a vehicle in which the internal combustion engine 10 is the only thrust generator that generates the thrust of the vehicle.

Regarding Pressure of Exhaust Gas, or Input of Update Limiting Process of Learning Values In the above-described embodiments, the update of the learning values is limited based on the exhaust pressure Pex detected by the exhaust pressure sensor 66. However, the present disclosure is not limited to this. For example, a sensor may be provided that detects the difference between the pressure at the downstream side and the pressure at the upstream side of the GPF 36, and a process may be executed to update the leaning value by using the detection value of the sensor as a parameter indicating the pressure of the exhaust gas flowing into the EGR passage. Also, for example, in view of the fact that the PM deposition amount DPM and the pressure difference are correlated with each other, the PM deposition amount DPM may be used as a parameter indicating the pressure of the exhaust gas flowing into the EGR passage to limit update of the learning values. In this case, the threshold that is compared with the PM deposition amount DPM in the process of S74 may be a fixed value. Also, the threshold that is compared with the PM deposition amount DPM in the process of S82 may be a fixed value.

Regarding EGR Control Process

In the above-described embodiments, an open-loop control of the EGR rate is performed based on the operating point of the internal combustion engine 10. For example, when the temperature of the coolant of the internal combustion engine 10 is lower than or equal to a specified temperature, a process may be executed to control the EGR rate to a target value that is less than a target value corresponding to the operating point of the internal combustion engine 10 in a case in which the coolant temperature is higher than the specified temperature.

Regarding Ignition Timing Controller

The ignition timing controller is not limited to a device that includes the CPU 52 and the ROM 54 and executes software processing. For example, at least part of the processes executed by the software in the above-illustrated embodiments may be executed by hardware circuits dedicated to executing these processes (such as ASIC). That is, the ignition timing controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Other Modifications

The internal combustion engine 10 is not necessarily required to have the GPF 36. Even if the GPF 36 is not provided, the EGR rate will be excessive in relation to the target value of the open-loop control, for example, when the deposit in the catalyst 34 reduces the cross-sectional flow area. It is thus effective to limit update of the learning values.

The internal combustion engine 10 is not necessarily required to have the port injection valve 16, but may be provided with a direction injection valve.

The EGR passage 40 is not necessarily required to be connected to a section of the exhaust passage 32 that is at the upstream of the catalyst 34, but may be connected to, for example, a section between the catalyst 34 and the GPF 36.

In the above-described embodiments, the learning values are stored in the backup RAM 56. However, the present disclosure is not limited to this. For example, the learning values may be stored in electrically rewritable nonvolatile memory. In this case, when the internal combustion engine 10 is operating, the learning values maybe stored in a normal RAM, which is turned off when the main power supply of the controller 50 is turned off. Prior to turning off the main power supply to the controller 50, a process of storing the leaning value stored in the RAM in the nonvolatile memory may be executed. However, the non-volatile memory in this process may be read as the backup RAM 56.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An ignition timing controller for an internal combustion engine, wherein
the internal combustion engine includes
an EGR passage that connects an exhaust passage and an intake passage to each other, and
an EGR valve that adjusts a cross-sectional flow area in the EGR passage,
the ignition timing controller is configured to execute:
an EGR control process of performing an open-loop control of a ratio of exhaust gas flowing into the intake passage from the EGR passage to fluid that is drawn into the intake passage by operating the EGR valve; and
a feedback process of operating an ignition device by advancing ignition timing within a range in which knocking can be suppressed by feedback control based on an output signal of a knocking sensor, and
the feedback process includes
an update process of updating a learning value based on an adjustment amount of the feedback control,
a setting process of setting the ignition timing based on the adjustment amount and the learning value, and
an update limiting process of limiting timing advancing update of the learning value in a case in which a pressure of exhaust gas flowing into the EGR passage is high as compared with a case in which the pressure of the exhaust gas is low.

2. The ignition timing controller for an internal combustion engine according to claim 1, wherein the learning value comprises a first learning value and a second learning value,
the update process includes
a first update process of updating the first learning value for each of regions divided according to a rotation speed of a crankshaft of the internal combustion engine, and
a second update process of updating the second learning value for each of regions divided according to a load parameter of the internal combustion engine and the rotation speed, and
the update limiting process includes
a first learning limiting process of prohibiting the first learning value from being updated to be more timing advancing than a predetermined advancing-side guard value, and
a second learning limiting process of prohibiting the second learning value from being updated when the pressure is higher than or equal to a threshold.

3. The ignition timing controller for an internal combustion engine according to claim 2, wherein
the learning value comprises a third learning value for correcting the ignition timing to a regarding side,
the update process includes a third update process of updating the third learning value when the load parameter is less than or equal to a predetermined mount, and
the update limiting process includes a third learning limiting process of prohibiting update of the third learning value when the pressure is higher than or equal to the threshold.

4. The ignition timing controller for an internal combustion engine according to claim 2, wherein the feedback process includes
an adjustment amount limiting process of limiting the adjustment amount to prevent the adjustment amount from being more timing retarding than a retarding-side upper limit, and
an enlarging process of enlarging the retarding-side upper limit when the update limiting process is limiting the timing advancing update of the learning value.

5. The ignition timing controller for an internal combustion engine according to claim 1, wherein the feedback process includes
an adjustment amount limiting process of limiting the adjustment amount to prevent the adjustment amount from being more timing advancing than an advancing-side upper limit, and
an enlarging process of enlarging the advancing-side upper limit when the update limiting process is limiting the timing advancing update of the learning value.

6. The ignition timing controller for an internal combustion engine according to claim 1, wherein
a filter for trapping particulate matter in exhaust gas is provided in the exhaust passage at a position at a downstream side of the EGR passage, and
the ignition timing controller is configured to execute removing process of removing particulate matter trapped by the filter.

7. The ignition timing controller for an internal combustion engine according to claim 1, wherein the update limiting process includes a time-dependent limiting process of limiting timing advancing update of the learning value when operating time of the internal combustion engine is longer than or equal to a predetermined time.

8. The ignition timing controller for an internal combustion engine according to claim 7, wherein the feedback process includes
an adjustment amount limiting process of limiting the adjustment amount to prevent the adjustment amount from being more timing advancing than an advancing-side upper limit, and
an enlarging process of enlarging the advancing-side upper limit when the time-dependent limiting process is being executed.

9. An ignition timing controller for an internal combustion engine, wherein
the internal combustion engine includes
an EGR passage that connects an exhaust passage and an intake passage to each other, and
an EGR valve that adjusts a cross-sectional flow area in the EGR passage,
the ignition timing controller comprises circuitry that is configured to execute:
an EGR control process of performing an open-loop control of a ratio of exhaust gas flowing into the intake passage from the EGR passage to fluid that is drawn into the intake passage by operating the EGR valve; and
a feedback process of operating an ignition device by advancing ignition timing within a range in which knocking can be suppressed by feedback control based on an output signal of a knocking sensor, and
the feedback process includes
an update process of updating a learning value based on an adjustment amount of the feedback control,
a setting process of setting the ignition timing based on the adjustment amount and the learning value, and
an update limiting process of limiting timing advancing update of the learning value in a case in which a pressure of exhaust gas flowing into the EGR passage is high as compared with a case in which the pressure of the exhaust gas is low.

10. An ignition timing control method for an internal combustion engine, wherein
the internal combustion engine includes
an EGR passage that connects an exhaust passage and an intake passage to each other, and
an EGR valve that adjusts a cross-sectional flow area in the EGR passage,
the ignition timing control method comprises:
performing an open-loop control of a ratio of exhaust gas flowing into the intake passage from the EGR passage to fluid that is drawn into the intake passage by operating the EGR valve; and
executing a feedback process of operating an ignition device by advancing ignition timing within a range in which knocking can be suppressed by feedback control based on an output signal of a knocking sensor, and
the feedback process includes
an update process of updating a learning value based on an adjustment amount of the feedback control,
a setting process of setting the ignition timing based on the adjustment amount and the learning value, and
an update limiting process of limiting timing advancing update of the learning value in a case in which a pressure of exhaust gas flowing into the EGR passage is high as compared with a case in which the pressure of the exhaust gas is low.

* * * * *